US 6,669,457 B2

(12) United States Patent
Scarzello et al.

(10) Patent No.: US 6,669,457 B2
(45) Date of Patent: Dec. 30, 2003

(54) DISMOUNTABLE TOROIDAL SUPPORT FOR TIRE MANUFACTURE

(75) Inventors: Osvaldo Scarzello, Turin (IT); Maurizio Marchini, Seregno (IT)

(73) Assignee: Pirelli Pneumatici S.p.A., Milan (IT)

( * ) Notice: Subject to any disclaimer, the term of this patent is extended or adjusted under 35 U.S.C. 154(b) by 222 days.

(21) Appl. No.: 09/959,245

(22) PCT Filed: Feb. 14, 2001

(86) PCT No.: PCT/EP01/01626

§ 371 (c)(1),
(2), (4) Date: Oct. 22, 2001

(87) PCT Pub. No.: WO01/62481

PCT Pub. Date: Aug. 30, 2001

(65) Prior Publication Data

US 2003/0157209 A1 Aug. 21, 2003

Related U.S. Application Data

(60) Provisional application No. 60/193,255, filed on Mar. 30, 2000.

(30) Foreign Application Priority Data

Feb. 21, 2000 (EP) .............................. 00830121

(51) Int. Cl.$^7$ ........................ B29C 33/76; B29D 30/12
(52) U.S. Cl. ................................. 425/55; 425/56
(58) Field of Search ........................ 425/54, 55, 56; 156/417

(56) References Cited

U.S. PATENT DOCUMENTS

| 1,356,596 A | * 10/1920 | Brundage | 425/56 |
| 1,551,014 A | * 8/1925 | Doak | 425/56 |
| 1,798,210 A | 3/1931 | Laursen | 264/326 |
| 1,954,764 A | 4/1934 | Anderson | 156/415 |
| 4,083,672 A | 4/1978 | Vaishnav | 425/457 |
| 4,106,888 A | 8/1978 | Calori | 425/577 |
| 4,116,596 A | 9/1978 | Pizzorno | 425/55 |
| 4,248,287 A | 2/1981 | Christman | 152/354 R |
| 6,113,833 A | 9/2000 | Ogawa | 264/326 |
| 2002/0053759 A1 | 5/2002 | Caretta | 264/326 |

FOREIGN PATENT DOCUMENTS

| EP | 0893237 | 1/1999 |
| EP | 0928680 | 7/1999 |

OTHER PUBLICATIONS

English–language translation of U.S. patent application No. 60/147,027.
English–Language Translation of EP Patent Application No. 99830405.9.

* cited by examiner

*Primary Examiner*—James P. Mackey
(74) *Attorney, Agent, or Firm*—Finnegan, Henderson, Farabow, Garrett & Dunner, L.L.P.

(57) ABSTRACT

A dismountable toroidal support for Tire manufacture includes a plurality of sectors, a flange, a counter-flange, and engagement devices. The sectors are aligned around a reference axis to define an outer surface reproducing an inner conformation of a Tire. The flange carries at least one attachment member for engagement with a handling device. The counter-flange can be operatively linked with the flange. The engagement devices can fixedly hold the sectors between the flange and the counter-flange. Each of the sectors has a main body with a substantially U-shaped outline which is delimited between an outer side defining an outer surface and an inner side facing the reference axis. The engagement devices include at least one attachment plate radially projecting from a respective inner side substantially in a plane normal to the reference axis and adapted to be removably engaged at a position axially interposed between the flange and the counter-flange.

11 Claims, 6 Drawing Sheets

DISMOUNTABLE TOROIDAL SUPPORT FOR TIRE MANUFACTURE

CROSS-REFERENCES TO RELATED APPLICATIONS

This application is a national stage entry under 35 U.S.C. §371 from International Application No. PCT/EP01/01626, filed Feb. 14, 2001, in the European Patent Office; additionally, Applicants claim the right of priority under 35 U.S.C. §119(a)–(d) based on patent application No. 00830121.0, filed Feb. 21, 2000, in the European Patent Office; further, Applicants claim the benefit under 35 U.S.C. §119(e) based on prior-filed, provisional application No. 60/193,255, filed Mar. 30, 2000, in the U.S. Patent and Trademark Office; the contents of all of which are relied upon and incorporated herein by reference.

BACKGROUND OF THE INVENTION

1. Field of the Invention

The present invention relates to a dismountable toroidal support for tyre manufacture, of the type comprising: a plurality of sectors circumferentially aligned around a geometric reference axis to define an outer surface substantially reproducing the inner conformation of a tyre being processed; a flange carrying at least one attachment member for engagement with a handling device; a counter-flange to be operatively linked with said flange at an axially opposite position; engagement devices for fixedly holding the sectors between said flange an, counter-flange.

2. Description of the Related Art

Production of a tyre for vehicle wheels essentially involves a manufacturing step in which the different constructional elements of the tyre are assembled following a preestablished sequence, and a subsequent vulcanization step in which, through pressing within a mould and simultaneous administration of heat, molecular cross-linking of the elastomer material employed in forming said constructional elements is caused, which will, as a result, bring about structural and dimensional stabilization of the tyre itself.

It should be pointed out, for the purposes of the present description, that by the term "elastomer material" it is intended the rubber blend in its entirety, i.e. the assembly formed of at least one base polymer suitably amalgamated with reinforcing fillers and process additives of various types.

The traditional production methods essentially involve that the constructional elements of the tyre, such as carcass plies, anchoring annular structures for the tyre beads, belt structure, sidewalls, tread band, etc. should be first made separately from each other, to be then sequentially assembled during the tyre manufacturing process.

The Applicant's present trend is however that of resorting to manufacturing methodologies enabling production and storage of semifinished products to be minimized or, possibly, eliminated.

Practically, research and development are presently addressed to new process solutions enabling the individual components to be made by directly forming them on the tyre being manufactured according to a preestablished sequence.

In this connection, manufacturing processes have been recently proposed and developed, by the Applicant itself as well, in which assembling of the components during the tyre manufacture takes place on a rigid toroidal support which is then introduced into a vulcanization press together with the tyre to be cured. When vulcanization has been completed, the rigid toroidal support must be removed from the tyre previously extracted from the vulcanizing unit.

To enable this removal, use of collapsible or dismountable toroidal supports is usually provided, which supports are made up of a plurality of circumferential sectors lending themselves to be individually retracted in a radial direction towards the rotation axis of the tyre for disengagement from the tyre itself passing through the space defined between the tyre beads.

Such a dismountable toroidal support is described in U.S. Pat. No. 4,106,888 for example, where provision is made for the presence of a first and a second series of circumferential sectors disposed in alternated relationship with each other and connected to respective linkages that, during a first step, carry out a radial translation inwardly of the tyre of the sectors belonging to the first series and axially extract said sectors from the tyre itself, in order to free the required space for radial translation of the sectors belonging to the second series which is accomplished during a subsequent step.

To avoid too many stresses being imposed to the tyre during radial translation of the sectors, appropriate grip members cause the tyre beads to be mutually open wide in an axial direction to enable extraction of the sectors in the absence of interference.

In document U.S. Pat. No. 4,116,596, in order to limit stresses on the tyre, the individual sectors are provided to have a structure which can contract in a radial direction, so that said sectors can pass between the tyre beads without the latter being required to open too wide.

Document EP 893 237 discloses a dismountable toroidal support in which mutual connection between the circumferential sectors is ensured by two axially opposite annular flanges that are kept in axial thrust relationship on opposite sides of the toroidal support by a cylindrical sleeve axially extending through the toroidal support itself. One end of the cylindrical sleeve acts against one of the flanges by means of a circumferential abutment, whereas the opposite end gets operatively in engagement with the other flange by screwing or bayonet coupling.

Removal of the toroidal support from the cured tyre involves that, at a dismantling station in which engagement of the tyre has been previously carried out, the cylindrical sleeve together with one of the flanges should be disengaged from the counter-flange and associated with a counter-flange and respective circumferential sectors previously arranged in an adjacent assembling station in order to constitute a new toroidal support which will be subsequently moved away. The tyre, together with the circumferential sectors of the toroidal support, is temporarily removed from the dismantling station to enable transfer of the counter-flange to the assembling station. When transferring is over, the tyre is engaged again in the dismantling station to enable removal of the circumferential sectors. Each sector is extracted from the tyre by a centripetal radial movement, to be subsequently transferred onto a respective support element arranged in the assembling station. When all sectors have been transferred to the assembling station, a radial movement of the respective support elements causes the same to circumferentially move close to each other, so that they are ready to engage a new sleeve with the respective flange, which have been removed from she toroidal support associated with the subsequent tyre transferred to the dismantling station.

SUMMARY OF THE INVENTION

In accordance with the present invention, it has been found that if a substantially U-shaped conformation in section is given to the toroidal support, important advantages can be achieved both in terms of quality of the finished product, particularly in connection with the consequent optimization of the curing process, and in terms of simplification of the disassembling and/or reassembling operations of the toroidal support at the end of the curing process.

More particularly, it is an object of the present invention to provide a dismountable toroidal support for tyre manufacture, characterized in that each of said sectors has a main body with a substantially U-shaped outline seen in cross-section, which is delimited between an outer side defining said outer surface, and an inner side facing said geometric reference axis, said engagement devices comprising, for each of said sectors, at least one attachment plate radially projecting from the inner side substantially in a plane normal to said geometric reference axis, and adapted to be removably engaged at a position axially interposed between said flange and counter-flange.

In more detail, the attachment plate of each sector substantially extends in an equatorial plane of the toroidal support and is preferably provided with at least one auxiliary through slot extending close to the inner side of the main body.

It may be also provided that along the inner side of the main body of each sector at least one draining section should be formed which extends from an inner circumferential edge of the toroidal support and gradually converges towards an equatorial plane of said toroidal support away from said geometric reference axis.

In a preferential embodiment, the engagement devices further comprise: connecting pins distributed around said geometric reference axis and having each an end head to be axially fitted through a through housing arranged in one of said attachment plates; hooking members to be operatively engaged each with the end head of one of said connecting pins to axially lock the attachment plate of one of said sectors between said flange and counter-flange.

In more detail, the connecting pins are preferably integral with said flange and said hooking members are operatively carried by said counter-flange.

The hooking members can be advantageously formed in a closure ring carried by the counter-flange and susceptible of rotation around the geometric reference axis.

Preferably, said engagement devices further comprise counter-bushes and spring elements operating on the counter-bushes to axially push them against the attachment plates of the sectors.

More specifically, the counter-bushes and said spring elements are operatively carried by the counter-flange, said counter-bushes being adapted to be axially fitted on the end heads of said connecting pins.

In accordance with a preferential embodiment, each of said through housings formed in said attachment plates has flared ends arranged to engage tapered portions carried by said connecting pins and counter-bushes, respectively.

In addition, each of said attachment plates is provided to further have at least one auxiliary fitting housing extending in parallel with said through housing for engagement of locating pegs provided on an apparatus for disassembling and reassembling of the toroidal support itself.

BRIEF DESCRIPTION OF THE DRAWINGS

Further features and advantages will become more apparent from the detailed description of a preferred but not exclusive embodiment of a dismountable toroidal support for tyre manufacture in accordance with the present invention. This description will be taken hereinafter with reference to the accompanying drawings, given by way of non-limiting example, in which.

DETAILED DESCRIPTION OF THE PREFERRED EMBODIMENTS

With reference to the drawings, a toroidal support to be employed in the manufacture of tyres of vehicle wheels in accordance with the present invention has been generally identified by reference numeral 1.

The toroidal support 1 comprises a plurality of sectors 2a, 2b circumferentially distributed around a common geometric reference axis Y. Sectors 2a, 2b are circumferentially delimited each between two respective circumferential confinement sides 3a, 3b and they bear each against one of the circumferential confinement sides 3a, 3b of the circumferentially following sector 2a, 2b, so as to define a continuous outer surface 4 substantially reproducing the inner conformation of a tyre being processed 5, previously formed through accomplishment and/or assembling of its components during a preceding manufacturing process, followed by a vulcanization process carried out within a mould 6 diagrammatically shown in FIG. 6.

By way of example, manufacture of tyre 5 can be carried out for example following the procedure described in document EP 928 680 in the name of the same Applicant. The vulcanization process can be, in turn, carried out following the provision of Patent application EP 99830405.9 in the name of the same Applicant as well, contents of which are considered as herein completely incorporated.

Figure 6:
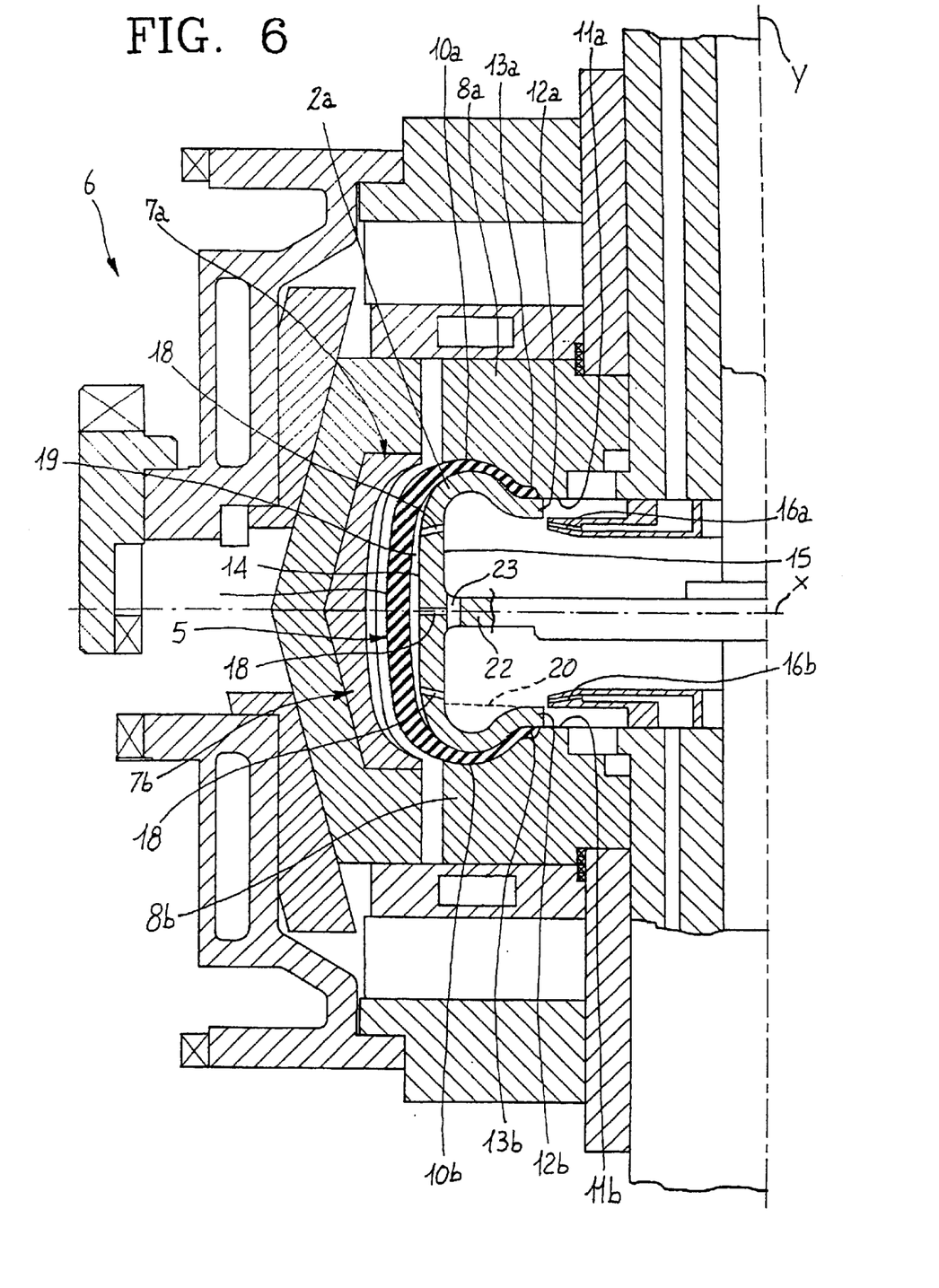
FIG. 6 is a diametrical section of the toroidal support within a vulcanization mould which is about to be opened at the end of a tyre vulcanization process.

As shown in FIG. 6, the vulcanization mould 6 essentially comprises a crown of sectors circumferentially distributed around it, each sector being divided into two halves 7a, 7b, an upper half and a lower half respectively, close to, just as an indication, an equatorial plane X of tyre 5, as well as a pair of axially opposite cheeks 8, an upper cheek 8a and a lower cheek 8b respectively. Sectors 7a, 7b operate at a radially outer position on tyre 5, to carry out moulding of a tyre tread band 9. Cheeks 8a, 8b in turn operate laterally on tire 5 to carry out moulding of respective sidewalls 10a, 10b. Each cheek 8a, 8b further has a circumferentially inner portion 11a, 11b cooperating in thrust relationship with an inner circumferential edge 12a, 12b of the toroidal support 1 to define a so-called tyre bead 13a, 13b.

Figure 4:
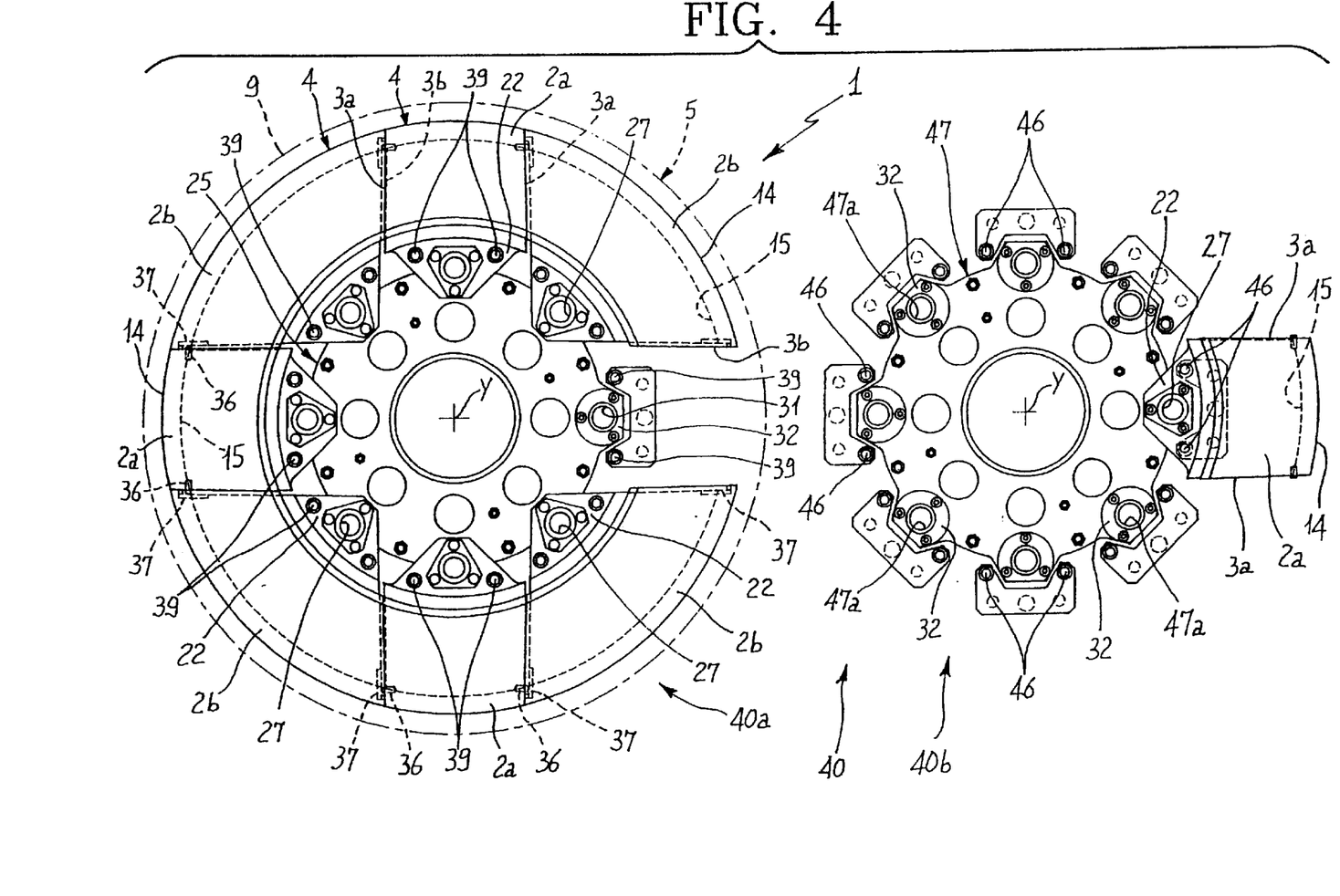
FIG. 4 is a diagrammatic top view of an operating step in which a circumferential sector removed from the tyre is transferred to an assembling station.

As clearly shown in FIG. 4, along the circumferential extension of the toroidal support 1 a first series and a second series of sectors, denoted by 2a and 2b respectively, are preferably identified. Sectors 2a, belonging to the first series have their respective circumferential confinement sides 3a substantially parallel to each other or slightly diverging towards the geometric axis Y, and at all events said sides do not diverge away from said geometric axis. Sectors 2b belonging to the second series in turn have the respective circumferential confinement sides 3b converging towards the geometric reference axis Y and preferably have a greater circumferential extension than sectors 2a belonging to the first series.

Sectors 2a, 2b belonging to the first and second series are disposed respectively in alternated relationship on the circumferential extension of the toroidal support, as clearly viewed from FIG. 4.

Each of the circumferential sectors 2a, 2b seen in cross-section advantageously has a substantially U-shaped outline, delimited between an outer side 14 cooperating in defining, together with the other sectors 2a, 2b, the outer surface 4 of the toroidal support 1, and an inner side 15 substantially facing the geometric reference axis Y and extending along an extension line substantially parallel to the extension line of the outer side 14. In conclusion, the conformation of the individual sectors 2a, 2b gives the toroidal support 1 taken as a whole an internally hollow structure which is completely open towards the geometric reference axis Y, which will bring about important advantages for reaching an efficient and homogeneous heat transmission to tyre 5 during the tyre vulcanization within mould 6.

It is in fact possible to create, within the toroidal support 1, a steam or other operating fluid flow licking the inner side 14 of sectors 2a, 2b at a short distance from the outer surface 4 of the toroidal support itself, so as to facilitate heat transmission to tyre 5 through the reduced thickness of the main body of the individual sectors 2a, 2b.

In order to further facilitate heat transmission, the individual sectors 2a, 2b are preferably provided to be made of an aluminium alloy.

Preferably, steam or another heating fluid is admitted to the mould 6 through a series of feeding nozzles 16a radially extending off from the geometric axis Y at the inner circumferential edge 12a disposed to the upper part of the toroidal support 1.

The steam flow thus created therefore licks the inner side 14 of each sector 2a, 2b at the upper sidewall 10a of tyre 5, to be subsequently deviated downwardly so as to lick the toroidal support 1 at the region radially internal to the tread band 9. Then the steam flow is submitted to a further deviation towards the geometric axis Y so as to lick the toroidal support 1 at the region of the lower sidewall 10b, to be subsequently drawn out of mould 6 through a series of discharge nozzles 10b circumferentially distributed in the lower part of the mould itself. As a result of the above, the whole inner surface of the toroidal support 1 is homogeneously licked by the steam flow to which a rotation motion around the geometric axis Y may be optionally also transmitted by giving the admission nozzles 16a an appropriate inclination relative to a direction radial to the geometric axis itself.

Through holes 18 are advantageously formed through each sector 2a, 2b at the region radially internal to the tread band 9 of tyre 5, to enable steam under pressure to reach a diffusion gap 19 which is created between the outer surface 4 of the toroidal support 1 and the inner surface of tyre 5 during the vulcanization process.

Turbulence induced to the steam flow following deviation imposed to it at the lower portion of the toroidal support 1 promotes elimination of the water possibly formed by condensation that could otherwise accumulate within the toroidal support, close to the lower sidewall 10b of tyre 5. Elimination of the condensation water can be further promoted by arranging, on the inner side of each sector 2a, 2b, a draining section 20 extending from the corresponding inner circumferential edge 12b of the toroidal support 1 in a direction gradually converging towards the equatorial plane X away from the geometric axis Y. The presence of the draining sections 20 on the individual sectors 2a, 2b defines, within the toroidal support 1, a frustoconical draining surface descending towards the discharge nozzles 16b arranged in mould 6, so as to convey the condensation water, that may be possibly formed during the vulcanization process, towards said nozzles.

During the processes for manufacturing and curing tyre 5, the mutual positioning of sectors 2a, 2b is set by engagement devices 21 comprising, for each sector 2a, 2b, at least one attachment plate 22 radially projecting from the inner side of sector 2a, 2b itself, preferably in the equatorial plane X or any other plane substantially normal to the geometric reference axis Y. Each attachment plate 22 is preferably provided with one or more through slots 23 formed close to the inner side 14 of the respective sector 2a, 2b in order not to hinder flowing of the steam created in mould 6 during vulcanization, as previously described. The attachment plates 22 lend themselves to be engaged between a flange 24 and a counter-flange 25 adapted to be put in mutual engagement at axially opposite positions, for carrying out mutual fastening of sectors 2a, 2b. Preferably associated with flange 24 is at least one attachment member 26, preferably made in the form of a shank coaxial with the geometric axis Y and provided with a tapered end portion 26a by which engagement of the toroidal support 1 by robotized arms or other devices intended for handling it along the tyre manufacturing and curing lines is carried out.

The attachment plates 22 of sectors 2a, 2b are provided, at a radially inner position, with respective through housings 27 through which respective connecting pins 28 can be axially fitted, which pins are rigidly carried by flange 24 and distributed, preferably along at least one circumferential line, around the geometric reference axis Y.

The connecting pins 28 cooperate with respective hooking members 17a carried by the counter-flange 25 and adapted to be each operatively engaged with an end head 28a provided on each of said connecting pins, on the opposite side from flange 24. More specifically, as better shown in FIG. 7, the end head 28a of each connecting pin 28 is defined by an annular groove 28b formed between frustoconical portions 28c converging away from the flange 24 carrying the connecting pin itself.

The hooking members 17a are in turn preferably formed on at least one closure ring 17 carried by the counter-flange 25 and susceptible of rotation around the geometric reference axis Y.

In particular, the closure ring 17 is disposed on guide and support rollers 29 rotatably carried by the counter-flange 25 and distributed around the geometric axis Y, and the hooking members 17a are essentially defined by radial projections present on said ring 17, provided with respective recesses 30 of a width substantially corresponding to the diameter measurable at the inside of groove 28b defined in the end head 28a of each connecting pin 28. The counter-flange 25 is provided with circumferentially-distributed through openings 31, each of which is entered by the end head 28a of one of the connecting pins 27, to enable engagement of the latter by the respective hooking member 17a.

Figure 5A:
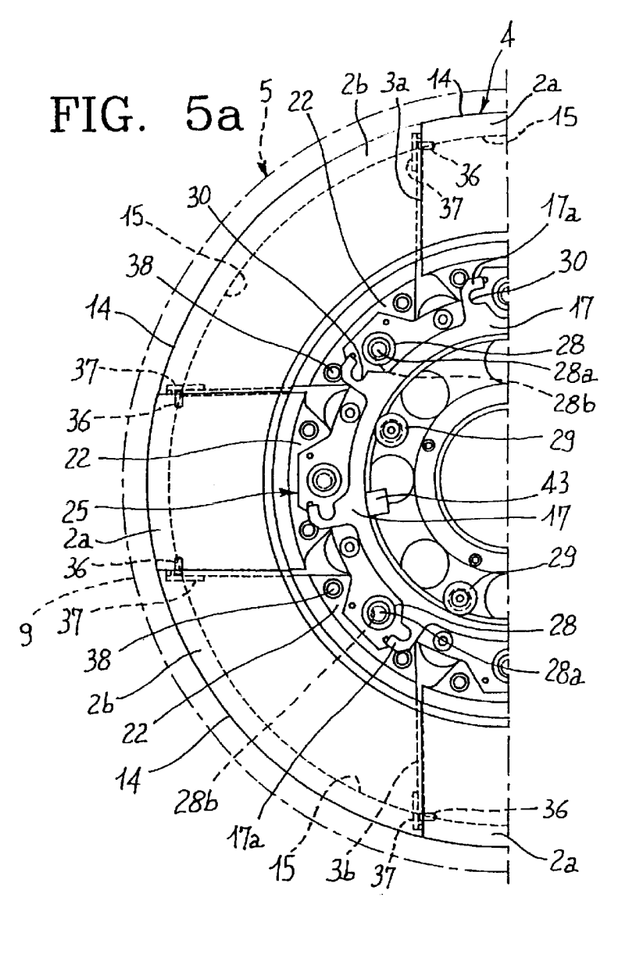
FIGS. 5a and 5b are diametrically interrupted axial views of the counter-flange in a disengagement condition and in a condition of engagement with the connecting pins carried by the flange, respectively.
Figure 5B:
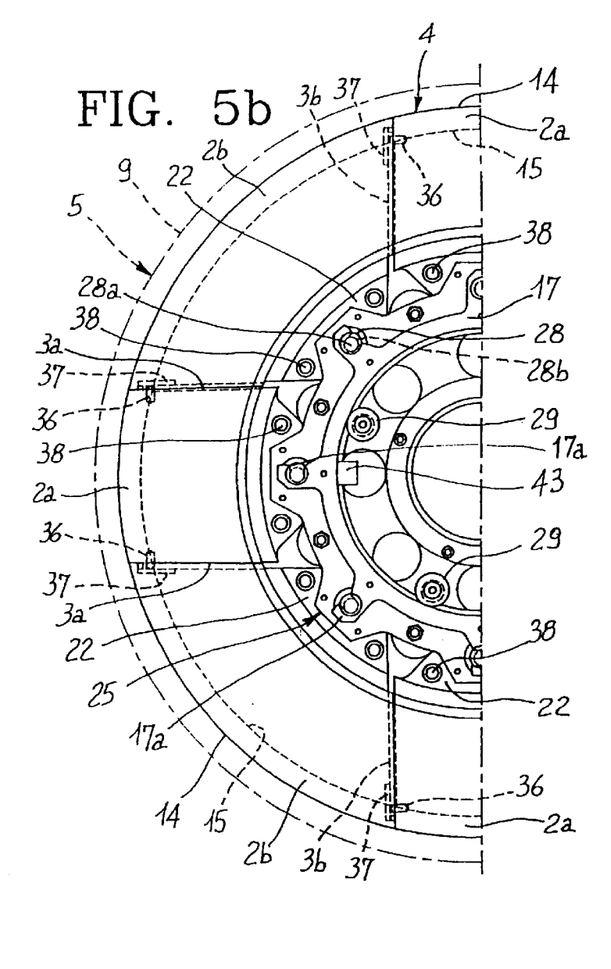

For this purpose, the closure ring 17 lends itself to be angularly rotated between a disengagement position in which, as shown in FIG. 5a, the hooking members 17a are spaced away from the respective through openings 31 of the counter-flange 25, and a closure condition in which, as viewed from FIG. 5b, each hooking member 17a has its respective recess 30 engaged in groove 28b of the connecting pin 28 fitted through the through housing 27.

To prevent free rotation of the closure ring 17 from the engagement condition to the disengagement condition and eliminate the risk that the counter-flange 25 may accidentally become disconnected from flange 24, also preferably associated with the engagement devices 21 are counter-bushes 32, acted upon by spring elements 33 to axially push them against the attachment plates 22 of sectors 2a, 2b when the flange 24 and counter-flange 25 are mutually in engagement. In particular, the counter-bushes 32 are associated with the counter-flange, each in axial alignment relationship with one of the through housings 27 arranged on the counter-flange itself.

Figures 1, 7:
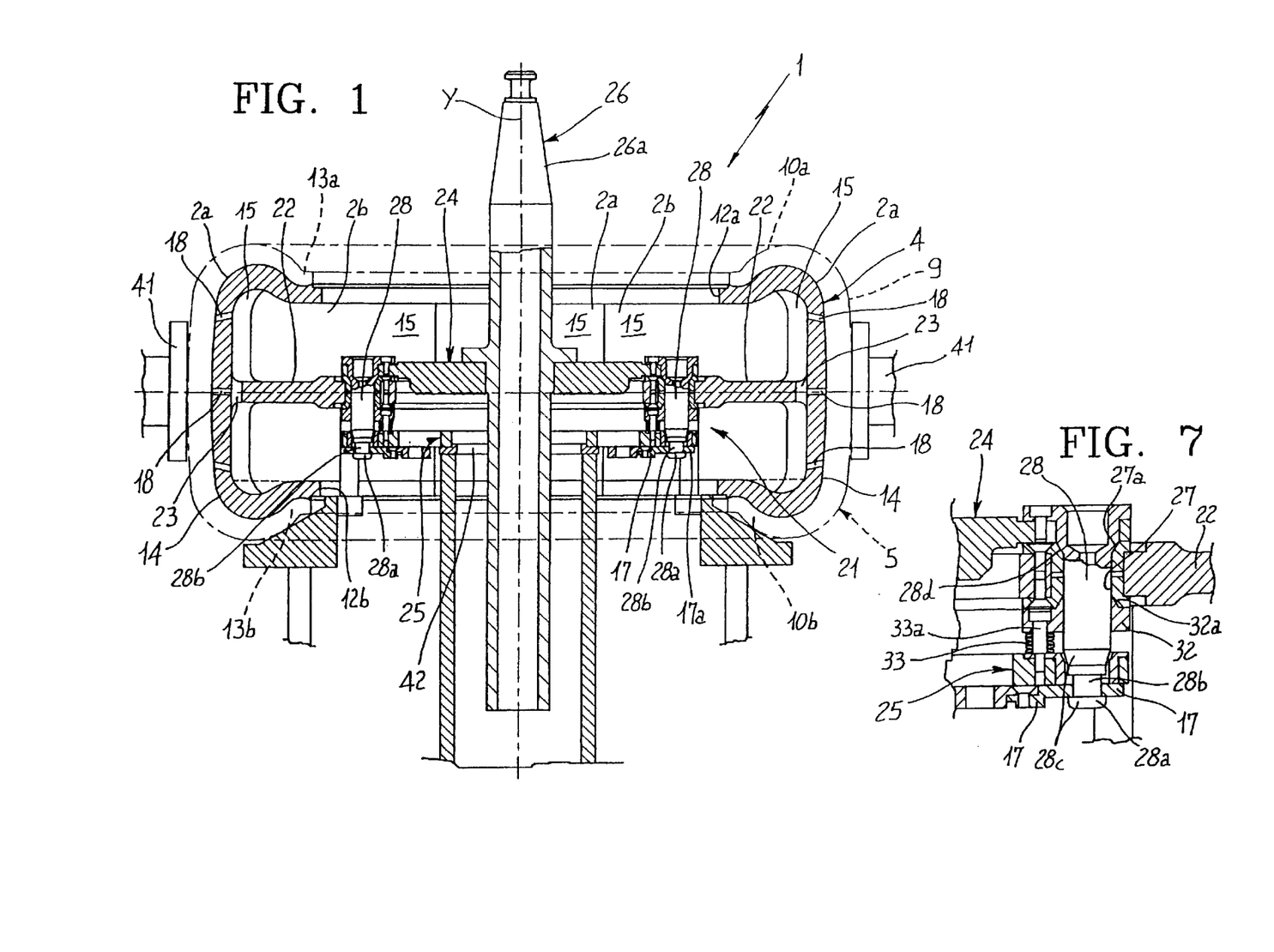
FIG. 1 diagrammatically shows, in a diametrical section, a toroidal support carrying a cured tyre while it is being positioned onto a dismantling station.
FIG. 7 shows a detail of FIG. 1 to an enlarged scale.

As better shown in FIG. 7, the spring elements 33 preferably consist of Belleville washers disposed on respective guide rods 33a fastened to the counter-flange 25 and slidably engaging the counter-bushes 32.

In order to ensure a precise mutual positioning of sectors 2a, 2b when mutual engagement between flange 24 and counter-flange 25 takes place, it is also preferably provided that each of the through housings 27 formed in the attachment plates 22 should have the respective opposite ends suitably flared, to operatively engage tapered upper-centering and lower-centering portions, 28d and 32a, carried by the connecting pins 28 close to flange 24 and by the counter-bushes 32 on the opposite side relative to the counter-flange 25, respectively.

In addition, each of the circumferential sectors 2a, 2b (in the example shown each sector 2b belonging to the first series) may be provided with one or more dowel plugs 36 projecting from at least one of its circumferential confinement sides 3a for engagement in operation with respective centering cavities 37 formed in the circumferential confinement sides 3b of the circumferentially following sectors 2a, 2b.

It is also provided that each of the attachment plates 22 should have auxiliary fitting housings 38 to be operatively engaged by locating pegs 39 set on an apparatus, generally identified by 40 in the drawings, for disassembling and reassembling of the toroidal support 1.

Removal of the toroidal support 1 from the cured tyre 5 preferably involves that, at the end of the vulcanization step, a high-pressure air flow or a flow of another high-pressure fluid be created within mould 6, which flow, moving along the inner wall of the toroidal support 1, will reach the diffusion gap 19 defined between the inner surface of tyre 5, already stabilized in its structural configuration, and the outer surface 4 of the toroidal support. Simultaneously with this air flow, opening of mould 6 is caused, with an initial step in which the centripetal sectors 7a, 7b of the mould itself are radially moved away from each other. As opening of mould 6 goes on, axial moving away of cheeks 8a, 8b occurs. During this step, the air under pressure admitted to the diffusion gap 19 tends to expand causing separation of tyre 5 from the outer surface 4 of the toroidal support 1, which separation takes place progressively towards the inner circumferential edges 12a, 12b of said toroidal support. This situation may advantageously facilitate the subsequent extraction of the individual sectors 2a, 2b that could be otherwise hindered, should the inner surface of tyre 5 adhere to the outer surface 4 of the toroidal support 1 too much.

In FIG. 6, mould 6 is shown at the moment immediately preceding beginning of axial moving away of cheeks 8a, 8b from each other for extraction of tyre 5.

When opening of the vulcanization mould 6 has been completed, the toroidal support 1 carrying the cured tyre 5 is picked up, at the attachment shank 26, by a robotized arm or another appropriate device and transferred to a dismantling station 40a being part of the disassembling and reassembling apparatus 40.

As shown in FIG. 1, when the toroidal support 1 is engaged in the dismantling station 40a, the locating pegs 39 arranged therein enter the fitting housings 38 formed in the attachment plates 22 of the individual sectors 2a, 2b, thereby ensuring a perfectly centred positioning of the toroidal support. The toroidal support can be conveniently locked to this position also with the aid of circumferentially distributed locking plates 41 intended for acting in thrust relationship on the outer surfaces of tyre 5.

While the toroidal support 1 is conveniently retained by said locking plates 41 and/or the robotized arm that has caused engagement of same in the dismantling station 40a, an annular counter-element 42 is brought into thrust relationship with the counter-flange 25 to free the hooking members 17a from the action exerted by the spring elements 33 tending to keep the hooking members themselves in thrust relationship against one of the side abutments delimiting the groove 28b formed in the end head 28a of the corresponding connecting pin 28.

Under this situation the closure ring 17 can be easily rotated from the engagement to the disengagement positions, upon command of an actuator for example, not shown as not of importance for the purposes of the present invention, which as provided in the dismantling station 40a and operates on one or more grip fins 42 radially projecting from the closure element.

The counter-flange 25 is thus disengaged from flange 24, to be then axially slipped off along the attachment shank 26, following lowering of the counter-ring 42 on which the counter-flange rests, for example.

Figure 2:
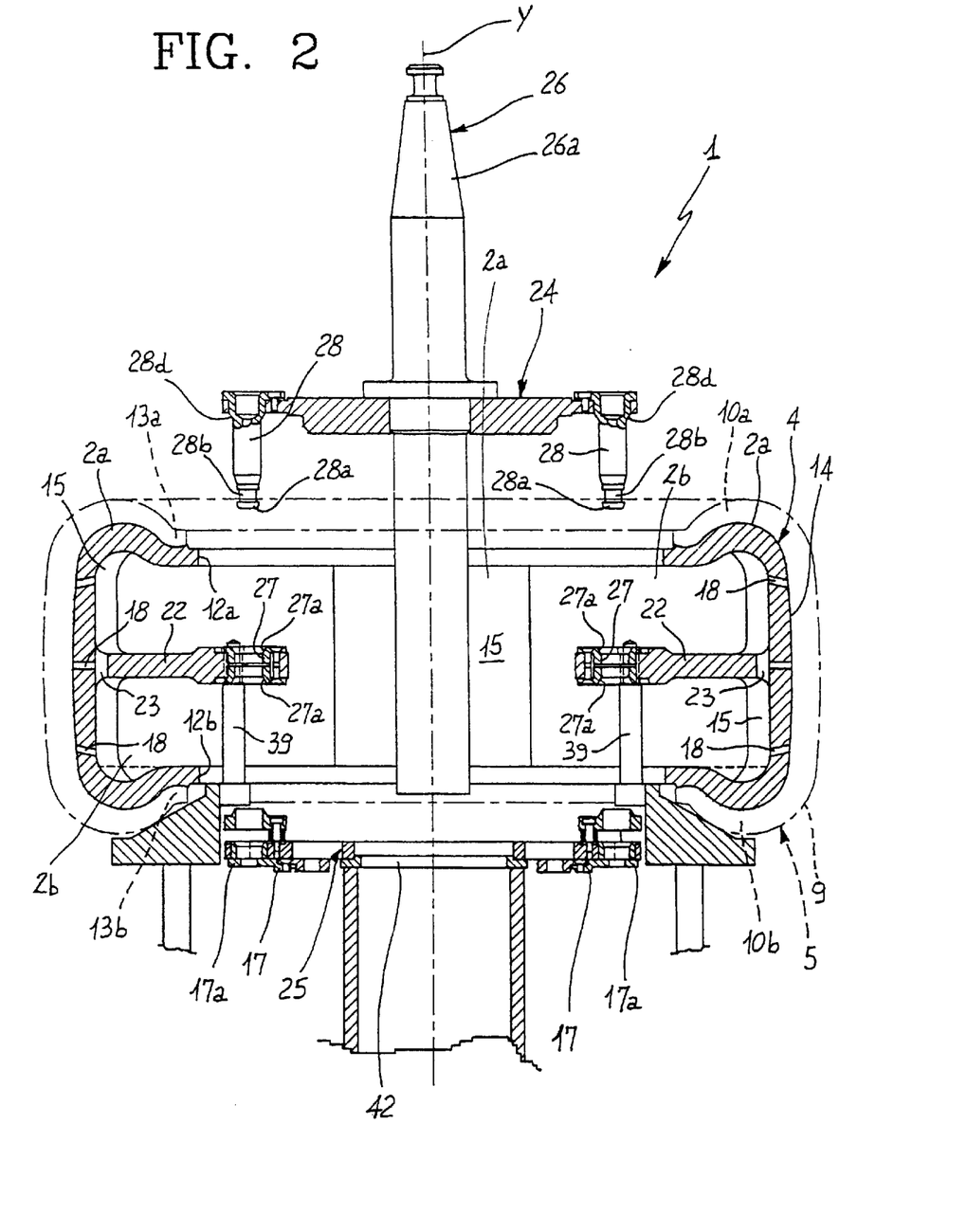
FIG. 2 is a diametrical section of the toroidal support during an operating step following that shown in FIG. 1 in which a flange together with a respective attachment shank is axially removed from the drum sectors, upon disengagement of the underlying counter-flange.

Concurrently with lowering of the counter-flange 25, or immediately after this operation, upon the action of the above mentioned robotized arm, axial lifting of flange 24 is caused, which will bring about, as a result, axial extraction of the connecting pins 28 from the respective through housings 27 provided in the attachment plates 22, as shown in FIG. 2. Flange 24 can be subsequently moved away from the dismantling station 40a and maintained in engagement with the robotized arm at its head, or set down in a stand-by station, not shown, upon the action of said robotized arm.

Then removal of the individual sectors 2a, 2b from tyre 5 is carried out. For the purpose, a grip clamp 34 of a robotized arm 35, which can be the same arm causing transferring of the toroidal support 1 to the dismantling station 40a, is brought into engagement with the attachment plate 22a of one of sectors 2a, 2b, and more specifically one of sectors 2a belonging to the first series. Engagement may be advantageously carried out through a plug 44 to be inserted into the through housing 27 and cooperating with a closure jaw 45 movable towards the plug to engage the radially inner end of the attachment plate 22.

When engagement has occurred, axial moving away of the locating peas 39 associated with sector 2a, 2b concerned with the action of the grip clamp 34 is caused and, as a result, said locating pegs will be disengaged from the auxiliary fitting housings 38. At this point the robotized arm 35 can determine extraction of sector 2a from tyre 5, through a centripetal radial translation movement.

It is however advantageously provided that, simultaneously with this centripetal radial translation movement, also an angular rotation movement should be imposed to sector 2a, 2b, which movement will be, by way of example, around at least one axis substantially normal to a direction radial to the geometric axis Y and will lie in a meridian plane offset with respect to the equatorial plane X of the toroidal support.

In more detail, the angular rotation movement is preferably provided to be carried out immediately before the centripetal radial translation movement begins, in at least two subsequent steps.

Figure 3A:
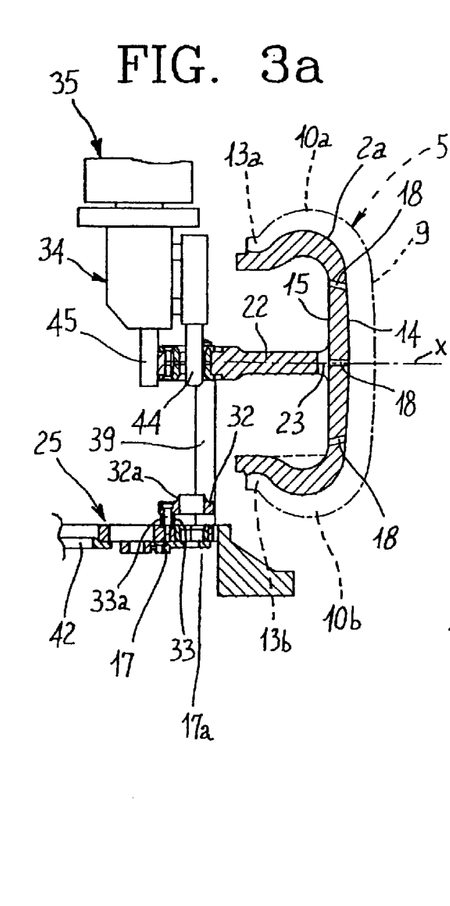
FIGS. 3a, 3b and 3c show the operating sequence carried out for removing one of the circumferential sectors of the toroidal support from the tyre.
Figure 3B:
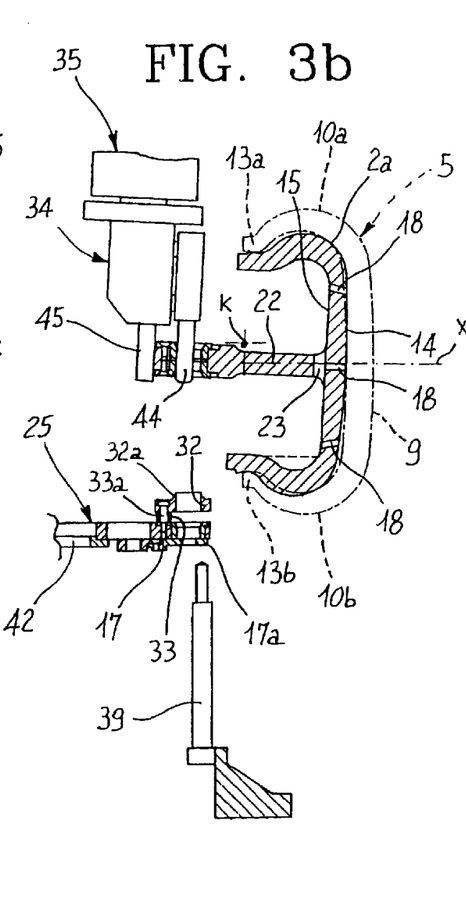

In a first step, shown in FIG. 3b, there is caused a limited angular oscillation of sector 2a, 2b around a first oscillation axis K disposed at an upper position with respect to the equatorial plane X and substantially concentric with the bending outline of the outer side 14 of sector 2a, 2b close to the corresponding shoulder region of tyre 5, i.e. the transition region between the sidewall 10a and the tread band 9.

In this way a first separation of the inner surfaces of tyre 5 from the toroidal support 1 occurs, if this separation did not take place in a correct and/or complete manner after admission of air under pressure to mould 6 at the end of the vulcanisation step.

Then a second angular rotation step is immediately carried out, and in this step sector 2a, 2b is rotated, just as an indication, around a second oscillation axis K' disposed below with respect to the equatorial plane X and substantially concentric with the bending outline of the outer side close to the shoulder region opposite to that mentioned above with reference to the preceding oscillation.

Figure 3C:
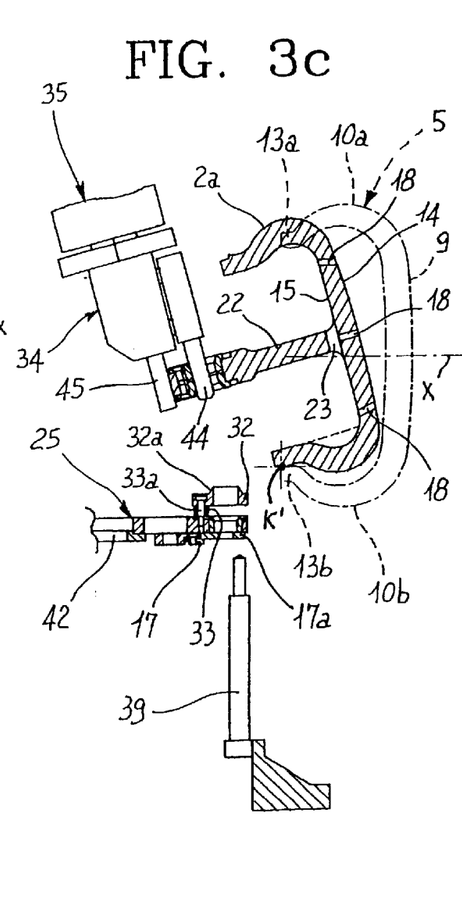

This second step ensures complete separation of the inner surfaces of tyre 5 from the toroidal support 1 and can be advantageously prolonged until complete extraction of the upper portion of sector 2a, 2b from the tyre bead 13a disposed at an upper position, as shown in FIG. 3c. During this step, also lifting of the lower portion of sector 2a, 2b with respect to the tyre bead 13b disposed at a lower position of the tyre 5 can be carried out.

When the second angular rotation step has been completed or simultaneously with execution of the final part of this rotation, radial translation of sector 2a, 2b towards the tyre axis is carried out so as to terminate extraction of said sector from tyre 5.

Then, the robotized arm 35 causes axial slipping off of sector 2a, 2b from tyre 5 in order to transfer it to a reassembling station 40b placed close to the dismantling station 40a.

As viewed from FIG. 4, in this step sector 2a, 2b is engaged on respective auxiliary locating pegs 46 similar in structure to said locating pegs 39 provided in the dismantling station 40a. When engagement has occurred, the attachment plate of sector 2a, 2b transferred to the reassembling station 40b is disposed over an auxiliary counter-flange 47 packed up from a toroidal support 1 removed from the corresponding tyre 5 during a preceding working cycle.

The through housing 27 of the attachment plate 22 is substantially in alignment with one of the through openings 47a of the auxiliary counter-flange 47.

When transferring is over, the clamp 34 of the robotized arm 35 is brought back to the dismantling station 40a to carry out removal and transfer of a new sector 2a, 2b, in the same manner as previously described. Preferably, all sectors 2a belonging to the first series are first removed, to afterwards carry out removal and transfer of sectors 2b belonging to the second series.

As the individual sectors 2a, 2b are removed from tyre 5, they are engaged one by one in the respective auxiliary locating pegs 46 arranged in the reassembling station 40b, so as to reassemble the toroidal support 1 therein, with sectors 2a, 2b in the same mutual positioning they had before disassembling of the toroidal support 1.

The auxiliary locating pegs 46 are preferably distributed along at least one circumferential line concentric with an auxiliary geometric reference axis Y', of a diameter slightly greater than that of the circumferential distribution line of the locating pegs 39 set in the dismantling station 40a. Sectors 2a, 2b are therefore positioned in the reassembling station 40b leaving a small space between the respective circumferential confinement sides 3a, 3b so as to avoid mechanical interferences between them that could hinder positioning of said sectors by the robotized arm.

When all circumferential sectors 2a, 2b have been transferred to the reassembling station 40b, flange 24 is transferred to the reassembling station too, and positioned coaxially above sectors 2a, 2b. The auxiliary locating pegs 46 can be simultaneously slipped off the auxiliary fitting housings 38 of sectors 2a, 2b. Flange 24 is then lowered so as to cause insertion of the connecting pins 28 into the respecting through housings 27. Due to tapering of the end heads 28a of the individual pins 28 and to the flared shape of the ends of the through housings 27, a correct insertion of the connecting pins 28 is ensured during this step, even though the through housings 27 are placed on a circumferential line of slightly greater diameter than the circumferential distribution line of the pins themselves.

In fact, the interference between the frustoconical surfaces defined in pins 28 and in the through housings 27 causes the automatic simultaneous radial displacement of all sectors 2a, 2b towards the auxiliary reference axis Y', bringing sectors 2a, 2b into a mutual-contact relationship on the respective opposite circumferential confinement sides 3a, 3b.

When insertion has occurred, flange 24 is brought into engagement with the auxiliary counter-flange 47, to complete reassembling of the toroidal support 1 in the reassembling station 40b. For this purpose, the counter-flange 25 is axially lifted so that its bushes 32 are engaged on the connecting pins 28 until they are brought into thrust relationship against the attachment plates 22 of sectors 2a, 2b. During this step, the end heads 28a of the connecting pins 28 penetrate into the through openings 47a of the auxiliary counter-flange 47 to be operatively engaged by the hooking members 17a following an angular rotation imposed to the closure ring 17.

At this point the toroidal support 1 is completely mounted, and it can be removed from the reassembling station 40b, to be used for example for manufacture of a new tyre 5 along a manufacturing line placed close to the disassembling and reassembling apparatus.

Tyre 5 can be in turn picked up from the dismantling station 40a of the toroidal support 1 and the counter-flange 25 still present therein will be transferred to the reassembling station 40*b* to be associated with sectors 2*a*, 2*b* and to the flange of the toroidal support 1 removed from a new tyre 5 in a subsequent work cycle.

The present invention achieves important advantages.

In fact, the invention enables an optimal heat transmission to the inner surfaces of tyre 5 to be achieved during the vulcanization process, by virtue of the possibility of creating a steam flow licking the whole inner surface of the toroidal support 1, without encountering obstacles during its travel from one to the other of the inner circumferential edges of the toroidal support.

The toroidal support 1 in accordance with the invention further enables an advantageous separation of the inner surfaces of tyre 5 from the toroidal support 1 to be obtained before extraction of sectors 2*a*, 2*b*, so as to eliminate the risk that anomalous stresses be imposed to the tyre during removal of each sector 2*a*, 2*b*.

It should be also pointed out that coupling between flange 24 and counter-flange 25 carried out by a mere axial-fitting operation followed by angular rotation of the closure ring 17 is very easy and quick.

What is claimed is:

1. A dismountable toroidal support for tyre manufacture, comprising:

a plurality of sectors circumferentially aligned around a geometric reference axis to define an outer surface substantially reproducing an inner conformation of a tyre being processed;

a flange carrying at least one attachment member for engagement with a handling device;

a counter-flange to be operatively linked with the flange at an axially-opposite position; and engagement devices for fixedly holding the sectors between the flange and the counter-flange;

wherein each of the sectors has a main body with a substantially U-shaped outline, seen in cross-section, which is delimited between an outer side defining an outer surface and an inner side facing the geometric reference axis, and wherein the engagement devices comprise, for each of the sectors, at least one attachment plate radially projecting from a respective inner side substantially in a plane normal to the geometric reference axis and adapted to be removably engaged at a position axially interposed between the flange and the counter-flange.

2. The toroidal support of claim 1, wherein the at least one attachment plate of each sector substantially extends in an equatorial plane of the toroidal support.

3. The toroidal support of claim 1, wherein the at least one attachment plate of each sector has at least one auxiliary through-slot extending close to the inner side of the main body.

4. The toroidal support of claim 1, wherein along the inner side of the main body of each sector, at least one draining section is formed which extends from an inner circumferential edge of the toroidal support and gradually converges towards an equatorial plane of the toroidal support away from the geometric reference axis.

5. The toroidal support of claim 1, wherein the engagement devices further comprise:

connecting pins distributed around the geometric reference axis and each having an end head to be axially fitted through a through-housing arranged in one of the attachment plates; and hooking members to be operatively engaged each with the end head of one of the connecting pins to axially lock a respective attachment plate of one of the sectors between the flange and the counter-flange.

6. The toroidal support of claim 5, wherein the connecting pins are integral with the flange and the hooking members are operatively carried by the counter-flange.

7. The toroidal support of claim 6, wherein the hooking members are formed in a closure ring carried by the counter-flange and susceptible of rotation around the geometric reference axis.

8. The toroidal support of claim 5, wherein the engagement devices further comprise counter-bushings and spring elements operating on the counter-bushings to axially push the counter-bushings against the attachment plates.

9. The toroidal support of claim 8, wherein the counter-bushings and the spring elements are operatively carried by the counter-flange, and wherein the counter-bushings are adapted to be axially fitted on the end heads of the connecting pins.

10. The toroidal support of claim 9, wherein each of the through-housings arranged in the attachment plates has flared ends arranged to engage tapered portions carried by the connecting pins and the counter-bushings.

11. The toroidal support of claim 5, wherein each of the attachment plates is provided with at least one auxiliary fitting housing extending parallel to the through-housing for engagement of locating pegs provided on an apparatus for disassembling and reassembling of the toroidal support.

* * * * *